United States Patent [19]

Lee

[11] Patent Number: 5,526,187

[45] Date of Patent: Jun. 11, 1996

[54] WIDE ANGLE ZOOM LENS

[75] Inventor: Hae-jin Lee, Kyeongsangnam-do, Rep. of Korea

[73] Assignee: SamSung Aerospace Industries, Ltd., Kyeongsangnam-do, Rep. of Korea

[21] Appl. No.: 358,751

[22] Filed: Dec. 19, 1994

[30] Foreign Application Priority Data

Dec. 22, 1993 [KR] Rep. of Korea ............... 93-29033

[51] Int. Cl.⁶ ......................................... G02B 15/14
[52] U.S. Cl. ............................................ 359/692; 359/689
[58] Field of Search ................................. 359/689, 692, 359/686, 683

[56] References Cited

U.S. PATENT DOCUMENTS

| | | | |
|---|---|---|---|
| 4,756,609 | 7/1988 | Estelle | 359/686 |
| 5,424,871 | 6/1995 | Ito et al. | 359/689 |

FOREIGN PATENT DOCUMENTS

| | | |
|---|---|---|
| 4426617A1 | 2/1995 | Germany. |
| 5-19166 | 1/1993 | Japan. |
| 406109973 | 4/1994 | Japan. |

*Primary Examiner*—Scott J. Sugarman
*Assistant Examiner*—Jacqueline M. Steady
*Attorney, Agent, or Firm*—Finnegan, Henderson, Farabow, Garrett & Dunner

[57] ABSTRACT

A wide angle zoom lens system. A first lens group has a positive refractive power, while a second lens group has a negative refractive power. The distance between the first lens group and the second lens group is changed during zooming. The first lens group includes a front group having a negative refractive power and a rear group having a positive refractive power. The front group includes a meniscus lens which is concave toward the object and has a negative refractive power, and the rear group includes at least four lenses which have positive or negative refractive powers, wherein $4.5<|f_r/f_W|<13$; $0.005<|K/f_r|<0.07$; and $20<|(f_{bW} \cdot f_r)/f_W|<100$ where $f_r$ is the focal length of the front group of the first lens group, $f_W$ is the focal length of the zoom lens at a wide angle position, $K$ is the distance along an optical axis from the surface of the lens closest to the image plane to a rear principal point in the first lens group; and $f_{bW}$ is the back focus distance at the wide angle position.

12 Claims, 6 Drawing Sheets

SPHERICAL ABERRATION

ASTIGMATISM
Y=21.6

DISTORTION
Y=21.6

SPHERICAL ABERRATION

ASTIGMATISM
Y=21.6

DISTORTION
Y=21.6

SPHERICAL ABERRATION

-0.5　　0　　0.5

ASTIGMATISM
Y=21.6

-0.5　　0　　0.5

DISTORTION
Y=21.6

-5%　　0　　5%

SPHERICAL ABERRATION

-0.5　　0　　0.5

ASTIGMATISM
Y=21.6

-0.5　　0　　0.5

DISTORTION
Y=21.6

-5%　　0　　5%

SPHERICAL ABERRATION

-0.5　0　0.5

ASTIGMATISM
Y=21.6

-0.5　0　0.5

DISTORTION
Y=21.6

-5%　0　5%

SPHERICAL ABERRATION

-0.5　0　0.5

ASTIGMATISM
Y=21.6

-0.5　0　0.5

DISTORTION
Y=21.6

-5%　0　5%

WIDE ANGLE ZOOM LENS

BACKGROUND OF THE INVENTION

A. Field of the Invention

The present invention relates to a wide angle zoom lens system with two lens groups. This wide angle zoom lens system has a compact construction and obtains a wide view angle and a long back focus distance by using a front lens having negative refractive power in the first lens group.

B. Description of the Related Art

A normal focal length lens has a focal length approximately equal to the diagonal length of the recorded image. Thus, in still picture photography, a 50 millimeter (mm) lens is generally considered a normal lens for 35 mm film which has a negative diagonal of approximately 42 mm. A wide angle lens has a focal length less than a normal lens, while a long or telephoto lens has a focal length greater than a normal lens.

In a zoom lens system, the overall focal length is adjustable with the widest angle of view at the shortest focal length and the narrowest angle of view at the longest focal length.

Recently, compact "lens shutter" cameras have been introduced. These cameras require a compact, wide angle zoom lens with high magnification. If a panoramic function is desired, the lens shutter cameras require a back focus distance longer than that of an ordinary compact zoom lenses to facilitate attachment of the panoramic mechanism.

In a zoom lens system composed of two lens groups, having a big zooming ratio and a wide view angle, the back focus distance is shortened at a wide angle position and the distance between the two lens groups is shortened at a telephoto position. These are critical problems.

In order to solve these problems, Japanese Patent laid-open No. 93-19166 discloses a wide angle zoom lens having a first lens group in which the first lens has a negative refractive power.

If a lens having a negative refractive power is used in the first lens group to obtain a long back focus distance in these conventional zoom lenses having a wide view angle and high magnification, the refractive power of the lens having a positive refractive power increases such that the sum of spherical aberration and Petzval's sum also increases. Thus, as the magnification increases, it is difficult to compensate for aberrations.

SUMMARY OF THE INVENTION

The present invention overcomes the problems and disadvantages of the conventional art by providing a wide angle zoom lens system which is compact, has good aberration performance, and has high magnification.

A front group including a meniscus lens having a negative refractive power concave toward an object is used in a first lens group to minimize aberrations caused in a lens disposed at the object side. Thus, lens aberrations at the image side are easily compensated and the mechanism for panoramic function is easily mounted.

To achieve the above objects, the present invention provides a wide angle zoom lens system comprising a first lens group having a positive refractive power and a second lens group having a negative refractive power arranged in sequence, in the respective order from an object side. The distance between the first lens group and the second lens group is variable during zooming. The first lens group includes a front group having a negative refractive power and a rear group having a positive refractive power arranged in sequence, in the respective order from the object side. The front group includes a meniscus lens which is concave toward the object and has a negative refractive power, and the rear group includes at least four lenses which have positive or negative refractive powers, wherein

[condition 1] $4.5 < f_F/f_W | < 13$;

[condition 2] $0.005 < |K/f_F| < 0.07$; and

[condition 3] $20 < |(f_{bW} \cdot f_F)/f_W| < 100$ where $f_F$: focal length of the front group of the first lens group, $f_W$: focal length of the wide angle zoom lens at the widest angle position (the shortest variable focal length of the zoom lens), $K$: distance along an optical axis from the surface of the lens closest to the image plane to a rear principal point (a second principal point) in the first lens group, wherein the direction toward the image plane is defined to have a positive sign, and $f_{bW}$: back focus distance at the widest angle position.

Also, the present invention provides the wide angle zoom lens system wherein the rear group of the first lens group includes a positive lens, a negative lens which is concave toward the object, and two positive lenses arranged in sequence, in the respective order from the object side, wherein

[condition 4] $0.85 < M/f_W < 1.5$; and

[condition 5] $0.05 < d_I/f_I < 0.055$ where $M$: distance along the optical axis from the surface of the lens closest to the object to the surface of the lens closest to the image plane in the first lens group, $f_I$: focal length of the wide angle zoom lens at the telephoto position, and $d_I$: distance along the optical axis from the surface of the lens closest to the image plane in the first lens group to the surface of the lens at the extreme toward the object in the second lens group.

Further, the present invention provides the wide angle zoom lens system wherein the second lens group includes a positive lens convex toward the image plane, a negative lens which is concave toward the object, and a negative lens which is convex toward the image plane arranged in sequence, in the respective order from the object side, wherein

[condition 6] $0.35 < |f_2/f_W| < 0.55$ where $f_2$: focal length of the second lens group.

Further details of the present invention will be set forth in the description which follows with reference to the accompanying drawings. The drawings, which are incorporated in and constitute a part of this specification, illustrate preferred embodiments of the invention and together with the description, serve to explain the principles of the invention.

DESCRIPTION OF THE PREFERRED EMBODIMENT

Figure 1A:
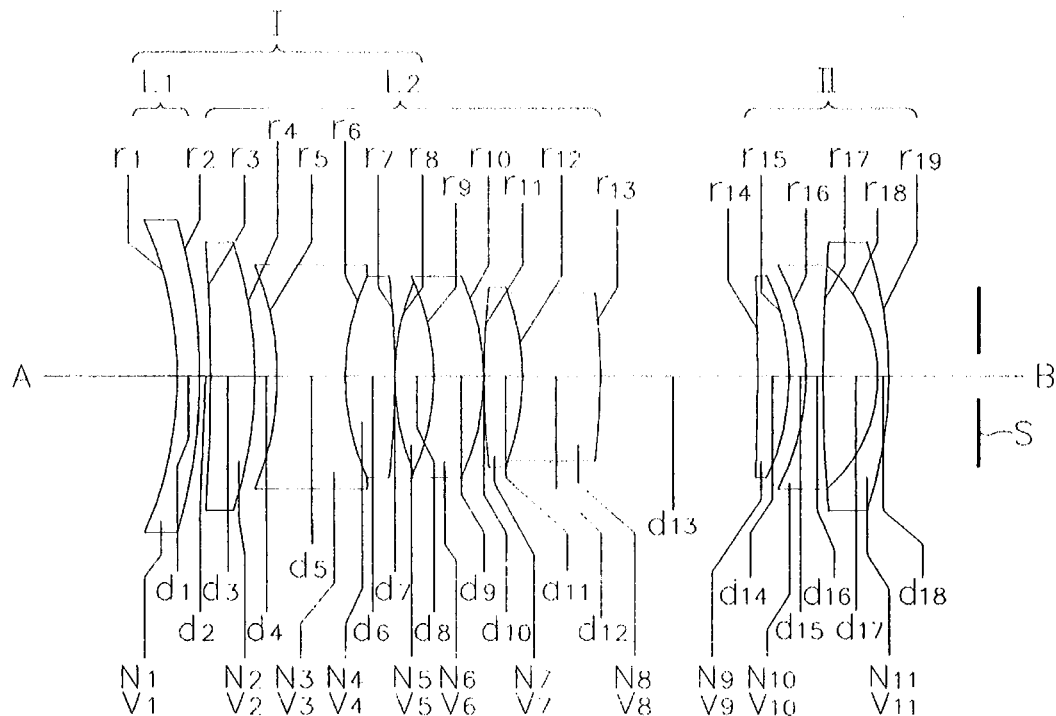
FIGS. 1A and 1B are sectional views of a wide angle zoom lens at wide angle and telephoto positions, respectively, according to a first embodiment of the present invention.

Reference will now be made in detail to first, second, and third preferred embodiments of the present invention, examples of which are illustrated in the accompanying drawings in reference to FIGS. 1A and 1B, 3A and 3B, and 5A and 5B, respectively. Wherever possible, the same reference numbers will be used throughout the drawings to refer to the same or like parts.

To facilitate the understanding of the structure and operation of the wide angle zoom lens system of the present invention, as embodied herein, a description of the zoom lens system according to the above three embodiments of the present invention is first collectively presented.

FIGS. 1A and 1B, 3A and 3B, and 5A and 5B show embodiments of a wide angle zoom lens. In FIGS. 1A, 1B, 3A, 3B, 5A, and 5B, $r_x$ indicates the radius of curvature of surface x, $N_x$ indicates the refractive index of optical element x, $d_x$ indicates the distance between optical surface x and optical surface x+1, and $V_x$ indicates the ABBE number of optical element x. The object to be imaged is located at approximately position A, while the image plane is located at approximately position B. The wide angle zoom lens may optionally include a lens shutter S.

The wide angle zoom lens system, as embodied herein, includes a first lens group I having a positive refractive power and a second lens group II having a negative refractive power arranged in sequence, in the respective order from the object side, The distance between the first lens group I and the second lens group II is varied during zooming. The first lens group I includes a front group L1 having a negative refractive power and a rear group L2 having a positive refractive power arranged in sequence, in respective order from the object side. The front group L1 includes a meniscus lens which has a negative refractive power and is concave toward the object, and the rear group includes at least four lenses which have positive or negative refractive powers,
wherein

[condition 1] $4.5 < |f_F/f_W| < 13$;

[condition 2] $0.005 < |K/f_F| < 0.07$; and

[condition 3] $20 < |(f_{bW} \cdot f_F)/f_W| < 100$ where $f_F$: focal length of the front group of the first lens group, $f_W$: focal length of the wide angle zoom lens at the widest angle position, K: distance along an optical axis from the surface of the lens closest to the image plane to a rear principal point (a second principal point) in the first lens group, wherein distance toward the image plane has a positive sign, and $f_{bW}$: back focus distance at the widest angle position.

The rear group L2 of the first lens group of the wide angle zoom lens system, as embodied herein, preferably includes a positive lens, a negative lens which is concave toward the object, and two positive lenses arranged in sequence, in the respective order from the object side, and the rear group L2 satisfies the conditions:

[condition 4] $0.85 < M/f_W < 1.5$; and

[condition 5] $0.05 < d_T/f_T < 0.055$ where

M: distance along the optical axis from the surface of the lens closest to the object to the surface of the lens closest to the image plane in the first lens group, $f_T$: focal length of the wide angle zoom lens at the telephoto position (the longest variable focal length of the zoom lens), and $d_T$: distance along the optical axis from the surface of the lens closest to the image plane in the first lens group to the surface of the lens closest to the object in the second lens group.

The second lens group II of the wide angle zoom lens system, as embodied herein, preferably includes a positive lens which is convex toward the image plane, a negative lens which is concave toward the object, and a negative lens which is convex toward the image plane arranged in sequence, in the respective order from the object side, and satisfies conditions:

[condition 6] $0.35 < |f_2/f_W| < 0.55$ where $f_2$: focal length of the second lens group.

In the wide angle zoom lens system, condition 1 defines an optimum focal length range of the front group of the first lens group. At a range higher than the upper limit of condition 1, the refractive power of the front group becomes weak such that the retrofocal characteristic of the whole optical system becomes weak and it is difficult to ensure the back focus distance. On the contrary, at a range lower than the lower limit of condition 1, the refractive power of the front group becomes too strong such that it is difficult to compensate for COMA aberrations at the wide angle position.

Condition 2 defines the distance along the optical axis from the lens closest to an image plane to the rear principal point in the first lens group. At a range higher than the upper limit of condition 2, the rear principal point of the first lens group becomes separated from the first lens group and the retrofocal characteristic becomes too strong such that the COMA aberration and astigmatism are unacceptable. On the contrary, at a range lower than the lower limit of condition 2, it is difficult to ensure the back focus distance at the wide angle position and the distance between the first lens group and the second lens group at the telephoto position, simultaneously.

Condition 3 defines an optimum relation between the focal length and the back focus distance at the wide angle position of the front group. At a range higher than the upper limit of condition 3, the refractive power of the front group becomes weak such that the retrofocal structure of the whole zoom lens system is destroyed. This happens when forcibly trying to ensure the back focus distance at the wide angle position, in which case it is difficult to maintain the distance between the first lens group and the second lens group at the telephoto position. On the contrary, at a range lower than the lower limit of condition 3, the refractive power of the front group becomes extremely strong such that the COMA aberration is unacceptable at the telephoto position.

Condition 4 defines an optimum distance along the optical axis from the surface of the lens closest to the object to the lens closest to the image plane in the rear group. At a range higher than the upper limit of condition 4, the rear group becomes thick such that the size of the whole lens system becomes large. On the contrary, at a range lower than the lower limit of condition 4, the size of the whole lens system becomes small while the distortion and COMA aberration become unacceptably large.

Condition 5 defines an optimum distance between the first lens group and the second lens group at the telephoto position. At a range higher than the upper limit of condition 5, the COMA aberration becomes unacceptable at the telephoto position. On the contrary, at a range lower than the lower limit of condition 5, the aberrations can be compensated for easily while it is difficult and impractical to design a mechanism for driving such a lens system.

Condition 6 defines an optimum focal length of the rear group. At a range higher than the upper limit of condition 6, the refractive power of the rear group becomes weak such that the displacement of the rear group for zooming operation becomes long and the overall length of the whole lens system becomes long. On the contrary, at a range lower than the lower limit of condition 6, the refractive power of the rear lens becomes weak such that it is difficult to compensate for the distortion and COMA aberration.

Figure 2A:
FIGS. 2A through 2F show the extent of various aberrations associated with the wide angle zoom lens at wide angle (FIGS. 2A–2C) and (FIGS. 2D–2F) telephoto positions, according to the first embodiment of the present invention.
Figure 2B:
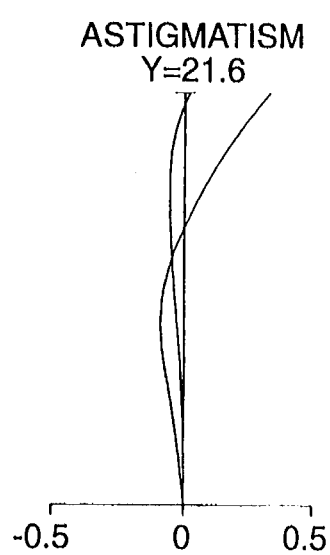
Figure 2C:
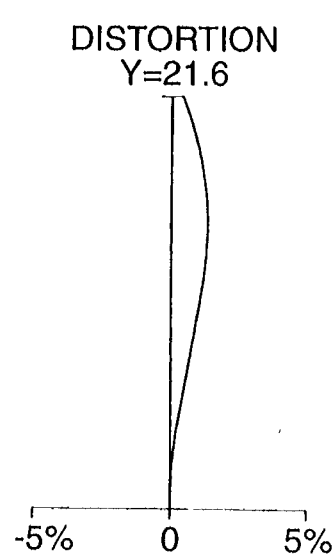
Figure 2D:
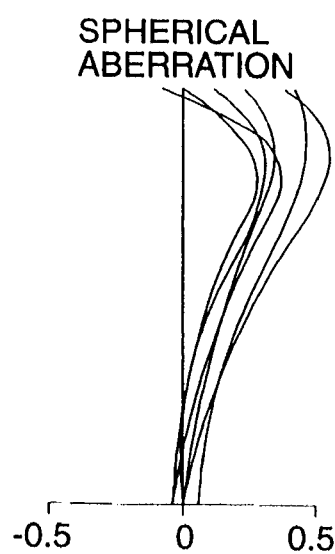
Figure 2E:
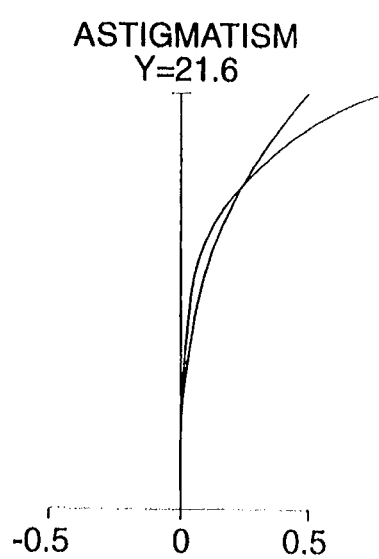
Figure 2F:
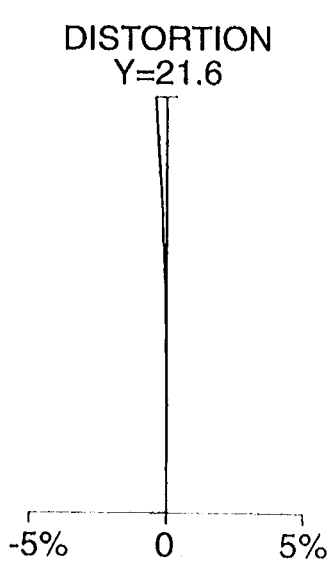

When the above conditions are fulfilled, various aberrations can be compensated for as shown in FIGS. 2A and 2B. As an example, FIGS. 2A and 2B show spherical aberration, astigmatism, and distortion. Therefore, it is possible to have the mechanism for panoramic function installed easily and accomplish a wide angle zoom lens system which is compact and has good optical performance and high magnification.

More specifically, the wide angle zoom lens system in accordance with each of the first, second, and third embodiments of the present invention is discussed individually below.

[Embodiment 1]

Figure 1B:
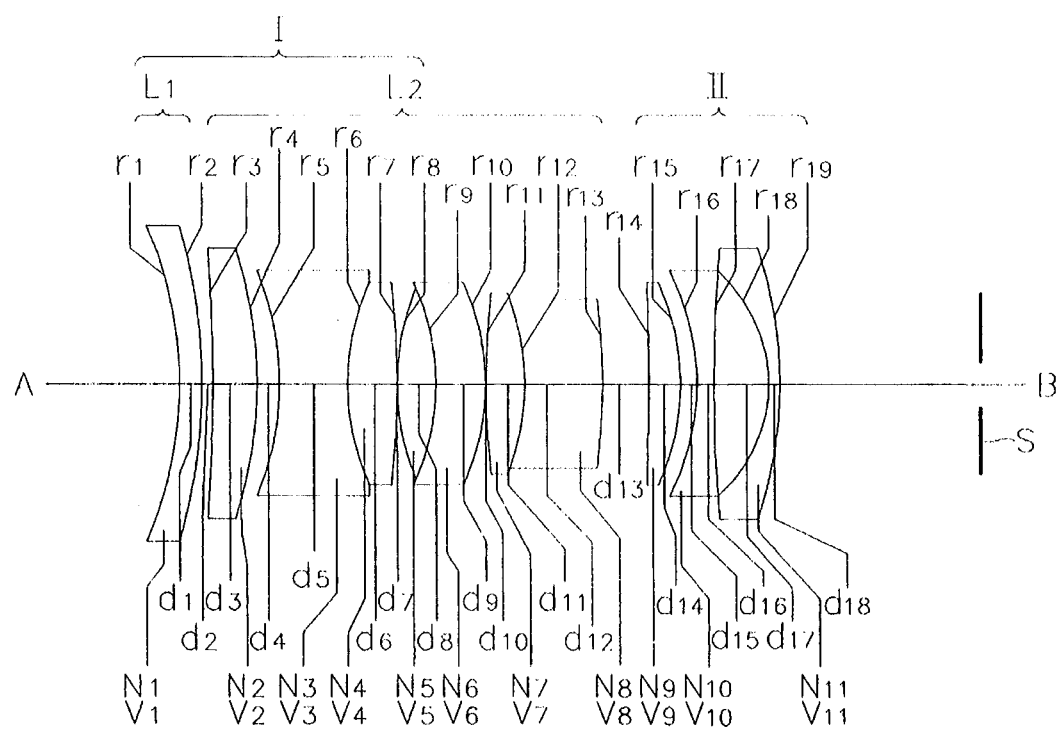

FIGS. 1A and 1B refer to the wide angle zoom lens system according to the first embodiment of the present invention. FIGS. 2A through 2F show the extent of various aberrations associated with the wide angle zoom lens system according to the first embodiment at various zoom lens system positions, and should be self explanatory. A set of exemplary parameter values for the first embodiment of the wide angle zoom lens system is provided in Table 1, where $F_{NO}$ is F number (focal length/diameter of the lens opening), f is focal length in millimeters, $f_B$ is back focus distance in millimeters, $2\omega$ is view angle, r is radius of curvature, d is lens thickness or space distance in millimeters, N is refractive ratio of d-line, and $\char`\^n$ is ABBE number of lens.

TABLE 1

$F_{NO} = 3.85$ to $11.3$
$f = 29.003$ to $84.937$
$2\omega = 73.90°$ to $30.4°$
$f_B = 8.50$ to $53.90$

| Surface Number | r | d | N | ^n |
|---|---|---|---|---|
| 1 | −25.483 | 1.56 | 1.80518 | 25.5 |
| 2 | −33.488 | 0.47 | | |
| 3 | −82.617 | 3.50 | 1.63854 | 55.5 |
| 4 | −25.355 | 1.93 | | |
| 5 | −16.420 | 5.00 | 1.81550 | 44.5 |
| 6 | 9.975 | 3.74 | 1.71736 | 29.5 |
| 7 | −44.864 | 0.12 | | |
| 8 | 15.960 | 2.50 | 1.51823 | 59.0 |
| 9 | −10.749 | 3.60 | 1.83400 | 37.3 |
| 10 | −14.810 | 0.10 | | |
| 11 | 53.692 | 2.33 | 1.48749 | 70.4 |
| 12 | −10.695 | 4.88 | 1.84666 | 23.8 |
| 13 | −24.797 | 8.081 to 2.500 | | |
| 14 | −91.312 | 2.25 | 1.72825 | 28.3 |
| 15 | −14.627 | 1.14 | | |
| 16 | −14.464 | 1.10 | 1.77250 | 49.6 |
| 17 | 105.326 | 3.75 | | |
| 18 | −9.121 | 0.63 | 1.75700 | 47.7 |
| 19 | −26.268 | | | |

The values of conditions 1 to 6 are as follows:

[condition 1] $|f_1/f_W|: 5.001$
[condition 2] $|K/f_1|: 0.019$
[condition 3] $|(f_{BW} \cdot f_1)/f_W|: 42.504$
[condition 4] $M/f_W: 0.955$
[condition 5] $d_1/f_1: 0.029$
[condition 6] $|f_2/f_W|: 0.487$

[Embodiment 2]

Figure 3A:
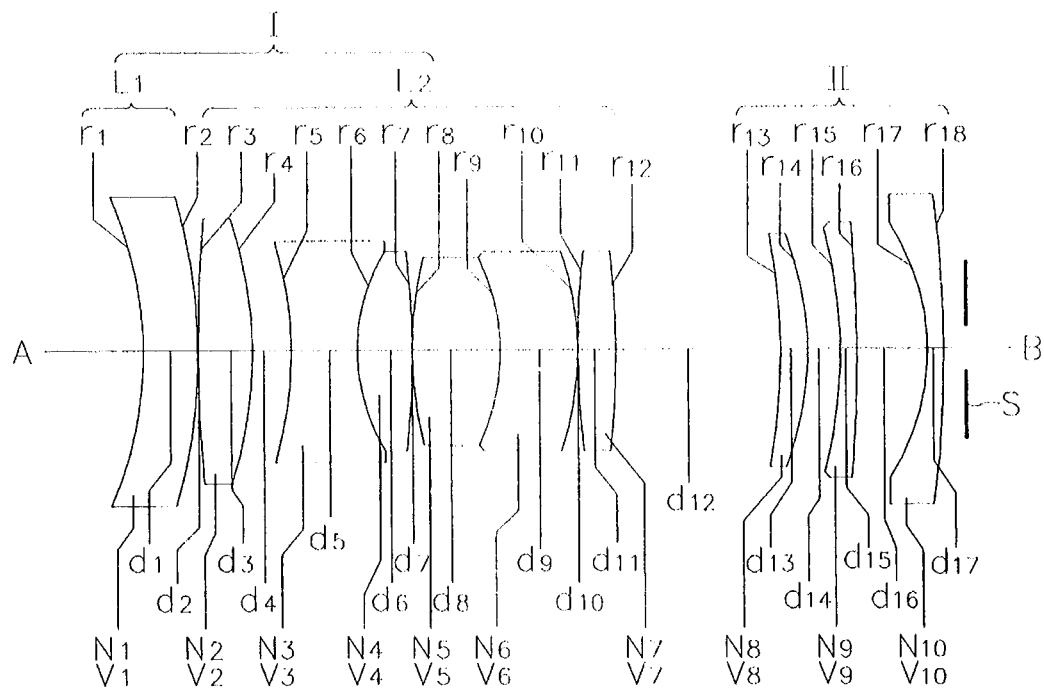
FIGS. 3A and 3B are sectional views of a wide angle zoom lens at wide angle and telephoto positions, respectively, according to a second embodiment of the present invention.
Figure 3B:
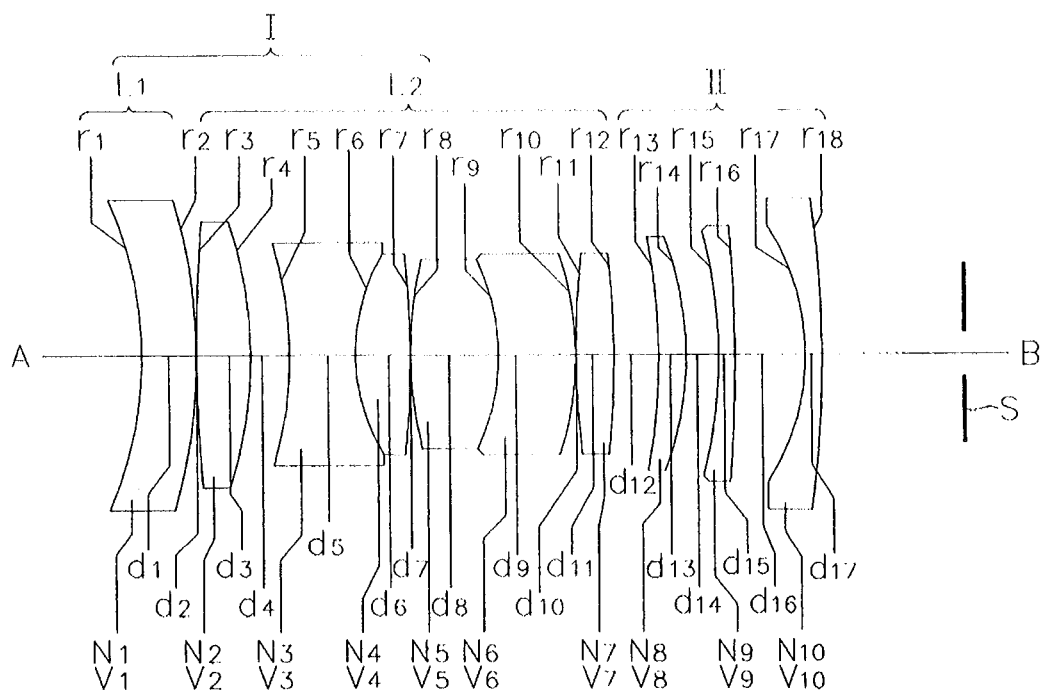
Figure 4A:
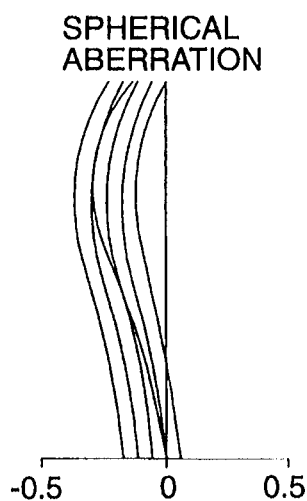
FIGS. 4A and 4B show the extent of various aberrations associated with the wide angle zoom lens at wide angle (FIGS. 4A–4C) and telephoto (FIGS. 4D–4F) positions, according to the second embodiment of the present invention.
Figure 4B:
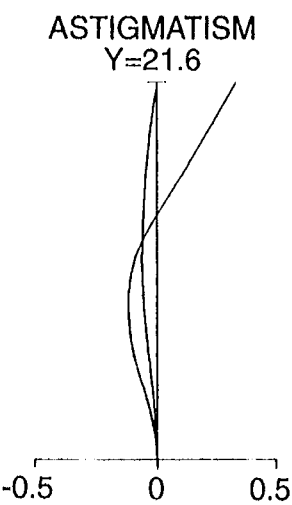
Figure 4C:
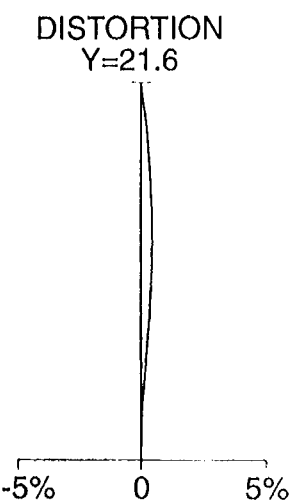
Figure 4D:
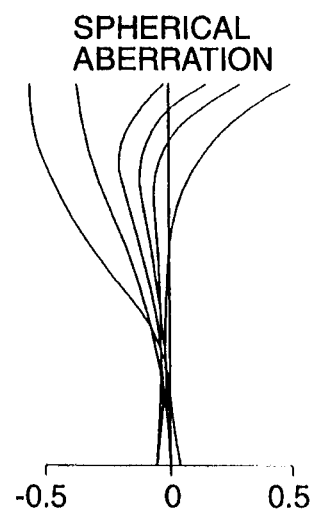
Figure 4E:
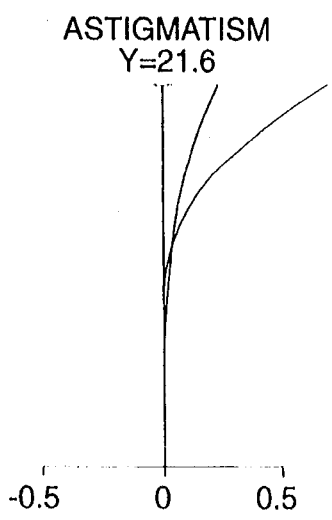
Figure 4F:
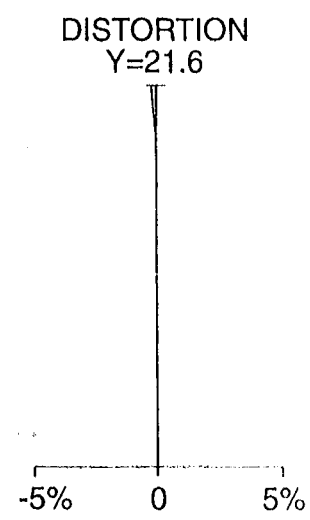

FIGS. 3A and 3B refer to the wide angle zoom lens system according to the second embodiment of the present invention. FIGS. 4A through 4F show the extent of various aberrations associated with the wide angle zoom lens system according to the second embodiment at various zoom lens system positions, and should be self explanatory. A set of exemplary parameter values for the second embodiment of the wide angle zoom lens system is provided in Table 2.

TABLE 2

$F_{NO} = 3.85$ to $9.54$
$f = 28.997$ to $74.972$
$2\omega = 72.90°$ to $31.97°$
$f_B = 8.00$ to $46.020$

| Surface Number | r | d | N | ^n |
|---|---|---|---|---|
| 1 | −23.817 | 5.00 | 1.75500 | 52.3 |
| 2 | −33.186 | 0.10 | | |
| 3 | 308.620 | 3.50 | 1.63854 | 55.5 |
| 4 | −29.471 | 3.00 | | |
| 5 | −20.063 | 4.00 | 1.83500 | 43.0 |
| 6 | 8.449 | 3.00 | 1.62374 | 47.1 |
| 7 | −40.387 | 0.10 | | |
| 8 | 19.836 | 5.00 | 1.51823 | 59.0 |
| 9 | −10.334 | 5.00 | 1.83400 | 37.3 |
| 10 | −18.137 | 0.10 | | |
| 11 | 142.047 | 2.40 | 1.48749 | 70.4 |
| 12 | −19.752 | 7.907 to 2.530 | | |
| 13 | −24.551 | 1.60 | 1.72825 | 28.3 |
| 14 | −16.228 | 2.96 | | |
| 15 | −18.734 | 1.30 | 1.77250 | 49.6 |
| 16 | −62.166 | 5.00 | | |
| 17 | −10.881 | 1.00 | 1.75700 | 47.7 |
| 18 | −52.497 | | | |

TABLE 2-continued $F_{NO} = 3.85$ to $9.54$
$f = 28.997$ to $74.972$
$2\omega = 72.90°$ to $31.97°$
$f_B = 8.00$ to $46.020$

| Surface Number | r | d | N | ^n |
|---|---|---|---|---|

The values of the conditions 1 to 6 are as follows:

| | |
|---|---|
| [condition 1] | $|f_F/f_W|$: 5.002 |
| [condition 2] | $|K/f_F|$: 0.032 |
| [condition 3] | $|(f_{bW} \cdot f_F)/f_W|$: 40.004 |
| [condition 4] | $M/f_W$: 0.900 |
| [condition 5] | $d_T/f_T$: 0.034 |
| [condition 6] | $|f_2/f_W|$: 0.500 |

[Embodiment 3]

Figure 5A:
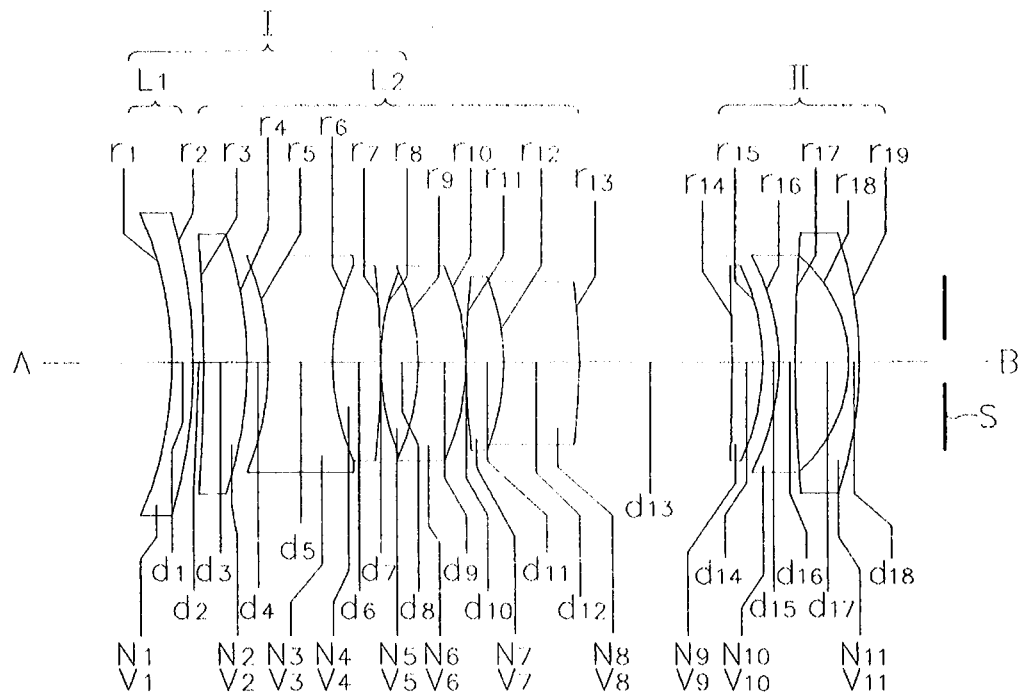
FIGS. 5A and 5B are sectional views of a wide angle zoom lens at wide angle and telephoto positions, respectively, according to a third embodiment of the present invention.
Figure 5B:
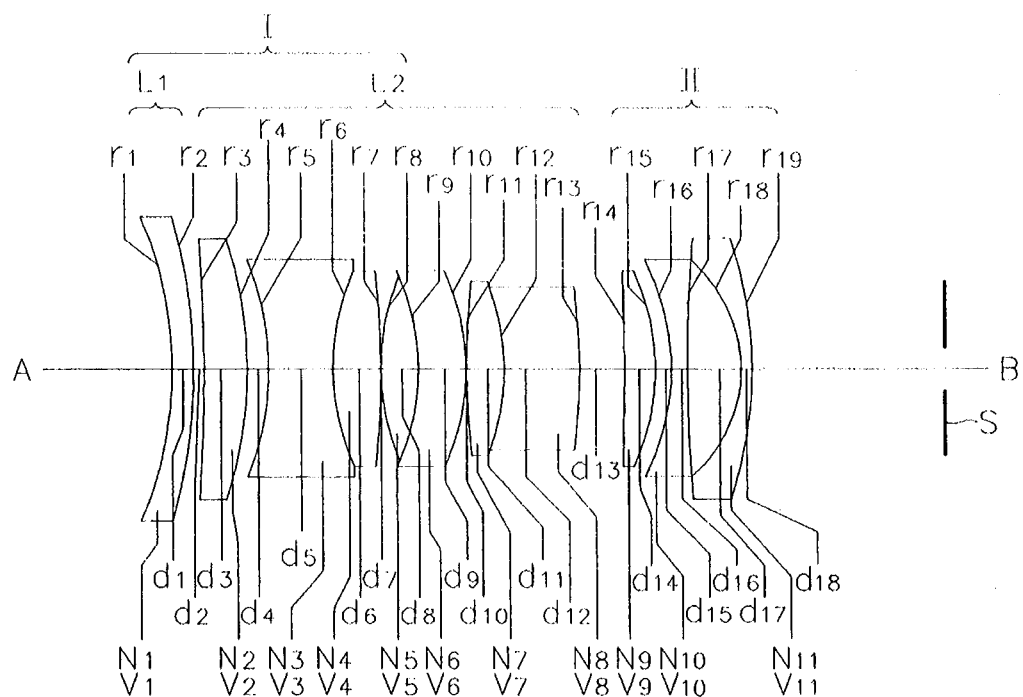
Figure 6A:
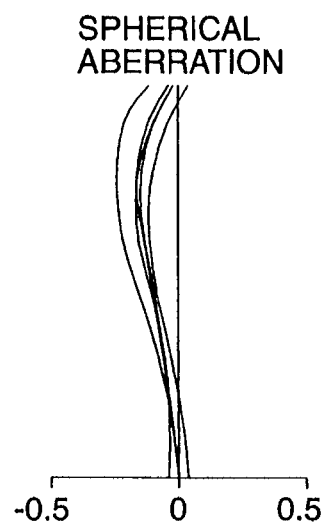
FIGS. 6A and 6B show the extent of various aberrations associated with the wide angle zoom lens at wide angle (FIGS. 6A–6C) and telephoto (FIGS. 6D–6F) positions, according to the third embodiment of the present invention.
Figure 6B:
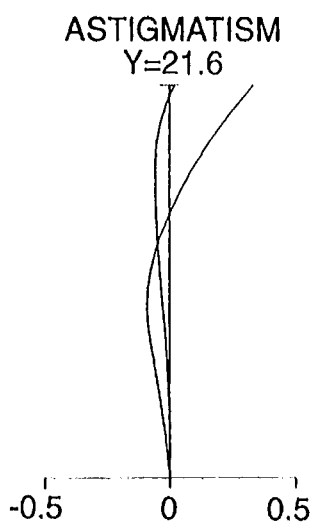
Figure 6C:
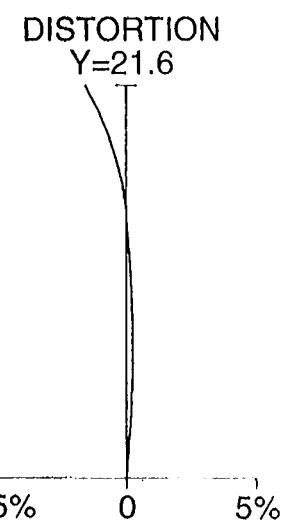
Figure 6D:
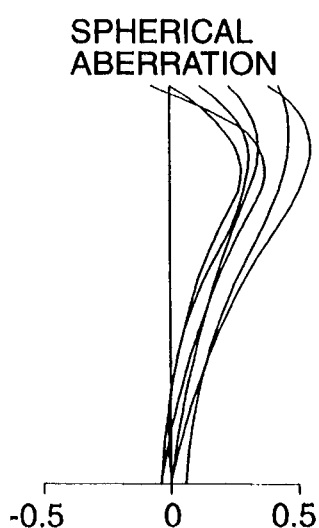
Figure 6E:
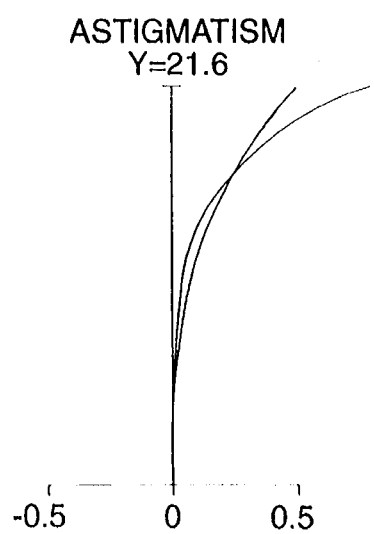
Figure 6F:
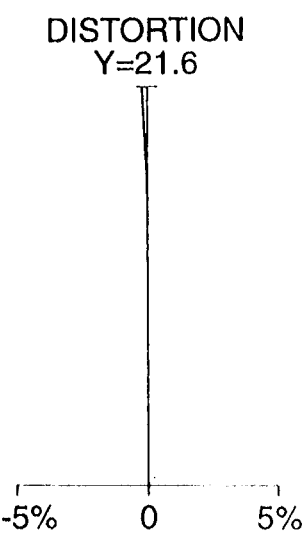

FIGS. 5A and 5B refer to the wide angle zoom lens system according to the third embodiment of the present invention. FIGS. 6A through 6F show the extent of various aberrations associated with the wide angle zoom lens system according to the third embodiment at various zoom lens system positions, and should be self explanatory. A set of exemplary parameter values for the third embodiment of the wide angle zoom lens system is provided in Table 3.

TABLE 3

$F_{NO} = 3.85$ to $9.95$
$f = 28.987$ to $74.866$
$2\omega = 73.90°$ to $30.39°$
$f_B = 7.98$ to $45.54$

| Surface Number | r | d | N | ^n |
|---|---|---|---|---|
| 1 | −27.464 | 1.79 | 1.74950 | 35.0 |
| 2 | −32.311 | 0.10 | | |
| 3 | −127.426 | 3.50 | 1.63854 | 55.5 |
| 4 | −25.565 | 1.00 | | |
| 5 | −17.891 | 5.00 | 1.83500 | 43.0 |
| 6 | 9.029 | 4.95 | 1.69895 | 30.1 |
| 7 | −45.408 | 0.10 | | |
| 8 | 15.668 | 2.50 | 1.51823 | 59.0 |
| 9 | −10.452 | 4.55 | 1.83400 | 37.3 |
| 10 | −14.471 | 0.10 | | |
| 11 | 76.301 | 2.31 | 1.51680 | 64.2 |
| 12 | −10.257 | 5.00 | 1.84666 | |
| 13 | −23.028 | 6.903 to 2.500 | | |
| 14 | −114.030 | 2.14 | 1.72825 | 28.3 |
| 15 | −14.228 | 1.01 | | |
| 16 | −13.926 | 1.10 | 1.77250 | 49.6 |
| 17 | 73.995 | 3.26 | | |
| 18 | −8.981 | 3.00 | 1.75700 | 47.7 |
| 19 | −32.427 | | | |

The values of the conditions 1 to 6 are as follows:

| | |
|---|---|
| [condition 1] | $|f_F/f_W|$: 10.011 |
| [condition 2] | $|K/f_F|$: 0.008 |
| [condition 3] | $|(f_{bW} \cdot f_F)/f_W|$: 79.925 |
| [condition 4] | $M/f_W$: 1.001 |
| [condition 5] | $d_T/f_T$: 0.033 |
| [condition 6] | $|f_2/f_W|$: 0.450 |

As explained and illustrated, the wide angle zoom lens system according to the present invention, by using the front group including the negative lens which is concave toward the object in the first lens group, is advantageous in that it is compact and has a high magnification, a long back focus distance, a view angle of more than 70° at the wide angle position, and good imaging performance. Further, the aberrations can be compensated for easily, and therefore, the wide angle zoom lens has a good aberration performance. Particularly, the mechanism for panoramic function can be installed easily and the reliability of the wide angle zoom lens is improved. Other embodiments of the invention will be apparent to the skilled in the art from consideration of the specification and practice of the invention disclosed herein. It is intended that the specification and examples be considered as exemplary only, with a true scope and spirit of the invention being indicated by the following claims. For example, the embodiments of this invention use a still picture 35 mm film format, while other lenses for different formats and applications may be made in accordance with this invention. Additionally, lenses according to this invention are not limited to lens shutter cameras, but may also be used with other cameras and such as focal plane shutter cameras.

What is claimed is:

1. A zoom lens system having a variable overall focal length, comprising:

a first lens group having a positive refractive power and a second lens group having a negative refractive power arranged in sequence in respective order from an object side, the distance between the first lens group and the second lens group being variable during zooming;

wherein the first lens group includes a front group having a negative refractive power and a rear group having a positive refractive power arranged in sequence in respective order from the object side;

wherein the front group of the first lens group includes a meniscus lens which is concave toward the object and has a negative refractive power, and the rear group of the first lens group includes at least four lenses which have positive or negative refractive powers; and wherein:

$4.5 < |f_F/f_W| < 13$;

$0.005 < |K/f_F| < 0.07$; and $20 < |(f_{bW} \cdot f_F)/f_W| < 100$ where $f_F$: focal length of the front group of the first lens group, $f_W$: the shortest variable focal length of the zoom lens, $K$: distance along an optical axis from the surface of the lens closest to an image plane to a rear principal point (a second principal point) in the first lens group, wherein the direction toward the image plane is defined to have a positive sign, and $f_{bW}$: back focus distance at the shortest variable focal length.

2. The zoom lens system as claimed in claim 1 wherein the rear group includes a positive lens, a negative lens which is concave on the object side, and two positive lenses arranged in sequence, in the respective order from the object side, wherein $0.85 < M/f_W < 1.5$; and $0.05 < d_T/f_T < 0.055$ where $M$: distance along the Optical axis from the surface of the lens closest to the object to the surface of the lens closest to the image plane in the first lens group, $f_T$: the longest variable focal length of the zoom lens, and $d_T$: distance along the optical axis from the surface of the lens closest to the image plane in the first lens group to the surface of the lens closest to the object in the second lens group.

3. The zoom lens system as claimed in claim 1 wherein the second lens group includes a positive lens convex toward the image plane, a negative lens concave toward the object, and a negative lens convex toward the image plane arranged in sequence, in the respective order from the object side, wherein $$0.35<|f_2/f_W|<0.55$$

where $f_2$: focal length of the second lens group.

4. The zoom lens system as claimed in claim 1, wherein the zoom lens system is a wide angle lens at the shortest variable focal length.

5. The zoom lens system as claimed in claim 4 wherein the zoom lens system is a telephoto lens at the longest variable focal length.

6. The zoom lens system as claimed in claim 5, further comprising a lens shutter.

7. The zoom lens system as claimed in claim 2, wherein the zoom lens systems is a wide angle lens at the shortest variable focal length.

8. The zoom lens system as claimed in claim 7 wherein the zoom lens system is a telephoto lens at the longest variable focal length.

9. The zoom lens systems as claimed in claim 8, further comprising a lens shutter.

10. The zoom lens system as claimed in claim 3, wherein the zoom lens system is a wide angle lens at the shortest variable focal length.

11. The zoom lens system as claimed in claim 10 wherein the zoom lens system is a telephoto lens at the longest variable focal length.

12. The zoom lens system as claimed in claim 11, further comprising a lens shutter.

* * * * *

UNITED STATES PATENT AND TRADEMARK OFFICE
CERTIFICATE OF CORRECTION

PATENT NO. : 5,526,187
DATED : June 11, 1996
INVENTOR(S) : Hae-jin LEE

It is certified that error appears in the above-indentified patent and that said Letters Patent is hereby corrected as shown below:

Title page, item [73], after "Assignee:", "SamSung" should read --Samsung--.

Abstract, line 16, "group;" should read --group,--.

Claim 1, column 8, line 35, "$|(f_{bW} \cdot f_F 0/f_W|$" should read --$|(f_{bW} \cdot f_F/f_W|$--.

Claim 2, column 8, line 59, "Optical" should read --optical--.

Claim 7, column 10, line 2, "systems" should read --system--.
Claim 9, column 10, line 7, "systems" should read --system--.

Signed and Sealed this

Fifteenth Day of July, 1997

Attest:

BRUCE LEHMAN

*Attesting Officer*          *Commissioner of Patents and Trademarks*